(12) United States Patent
Tsuchiya et al.

(10) Patent No.: US 8,104,765 B2
(45) Date of Patent: Jan. 31, 2012

(54) DOCUMENT FEEDER FOR EFFICIENTLY SUPPLYING ORIGINALS AND STORING ORIGINALS IN A DISCHARGE STACKER AFTER READING

(75) Inventors: Atsushi Tsuchiya, Minami-Alps (JP); Yoshihiko Minagawa, Minami-Alps (JP)

(73) Assignee: NISCA Corporation, Yamanashi-Ken (JP)

( * ) Notice: Subject to any disclaimer, the term of this patent is extended or adjusted under 35 U.S.C. 154(b) by 1164 days.

(21) Appl. No.: 11/188,871

(22) Filed: Jul. 26, 2005

(65) Prior Publication Data

US 2006/0023269 A1    Feb. 2, 2006

(30) Foreign Application Priority Data

Jul. 29, 2004 (JP) ................ 2004-221503

(51) Int. Cl.
*B65H 5/34* (2006.01)

(52) U.S. Cl. ... 271/270; 271/3.01; 271/4.08; 271/10.09; 358/498

(58) Field of Classification Search ............ 358/498; 271/3.01, 3.14, 4.01, 4.08, 4.1, 10.01, 10.09, 271/10.11, 10.12, 242, 270, 258.01

See application file for complete search history.

(56) References Cited

U.S. PATENT DOCUMENTS

| | | | | |
|---|---|---|---|---|
| 4,461,465 A * | 7/1984 | Hartman et al. | ................ | 271/22 |
| 5,119,145 A * | 6/1992 | Honjo et al. | ................ | 399/371 |
| 5,412,462 A * | 5/1995 | Matsuo et al. | ................ | 399/367 |
| 5,534,973 A * | 7/1996 | Harada | ................ | 399/1 |
| 5,634,635 A * | 6/1997 | Kobayashi et al. | ........... | 271/3.16 |
| 5,662,320 A * | 9/1997 | Fujiwara et al. | ............. | 271/3.14 |
| 5,671,917 A * | 9/1997 | Choho et al. | ................ | 271/111 |
| 5,819,152 A * | 10/1998 | Kobayashi et al. | ........... | 399/371 |
| 5,915,158 A * | 6/1999 | Minagawa et al. | ........... | 399/370 |
| 6,038,424 A * | 3/2000 | Nakagawa | ................ | 399/367 |
| 6,219,503 B1 * | 4/2001 | Miyake et al. | ................ | 399/85 |
| 6,257,692 B1 * | 7/2001 | Yokoi et al. | ................ | 347/16 |
| 6,502,818 B1 * | 1/2003 | Nonaka et al. | ........... | 271/258.01 |

FOREIGN PATENT DOCUMENTS

| | | |
|---|---|---|
| JP | 11-222345 | 8/1999 |
| JP | 2001-302053 | 10/2001 |

* cited by examiner

*Primary Examiner* — Benny Tieu
*Assistant Examiner* — Michael Tzeng
(74) *Attorney, Agent, or Firm* — Manabu Kanesaka

(57) ABSTRACT

In a document feeder, a length of a discharge path from a reading position to a discharge position is longer than a length of a supply path from a feeding position to the reading position. An idling discharge position is disposed, where the distance with the discharge position through the discharge path is shorter than a distance between the feeding position and the reading speed switching position. A control device controls driving of registration rollers, conveyor rollers and discharge rollers simultaneously when a trailing edge of an original reaches the discharge idling position of the discharge path by the discharge rollers while the discharge rollers is stopped. The document feeder efficiently supplies originals sequentially to the reading position, stably reads the image of the original without discharging a previous original during a reading, and aligns and stores the originals in a discharge stacker.

11 Claims, 13 Drawing Sheets

DOCUMENT FEEDER FOR EFFICIENTLY SUPPLYING ORIGINALS AND STORING ORIGINALS IN A DISCHARGE STACKER AFTER READING

BACKGROUND OF THE INVENTION AND RELATED ART STATEMENT

The present invention relates to a document feeder that separates originals stacked on a stacker and feeds an original one at a time to a reading platen, sequentially reads images on the original at the platen and stores read originals in a discharge stacker.

Generally, an original conveyor apparatus equipped on a glass platen of an image reading apparatus, such as a copier or scanner, is well known in the prior art. Such apparatuses are known to separate originals stacked on a feeder tray into single sheets and to feed a separated original to a reading position on the platen of the image reading apparatus. Then, after images on the original are read using reading means of a light source of the image reading apparatus, mirrors, a lens and CCD, such apparatuses discharge the read original to a storage tray.

Such apparatuses often arrange a sheet supply stacker and a discharge stacker one above the other over a platen, and convey an original over a platen from the sheet supply stacker to the discharge stacker through a U-shaped path. Accordingly, such apparatuses have a feed path at an upstream side of the platen, and a discharge path at a downstream side of the platen. Generally, these paths are formed into a U-shape because of the vertical arrangement of stackers. One or a plurality of roller pairs is arranged in the feed path for conveying an original to the platen. Similarly, the discharge path is also arranged with one or a plurality of roller pairs for discharging an original from the platen to the discharge stacker. These roller pairs are configured to be driven by a drive motor. The system is controlled to convey an original at a predetermined, constant conveying speed up to a predetermined position on the platen, and then switch to a reading speed that is set according to whether the original is in color or in black and white, and according to a reading resolution, in order to convey the original at that reading speed. Then, the system is controlled to discharge the original.

Like the system disclosed in the Japanese laid-open patent Publication No. 2001-302053, these kinds of apparatuses are controlled to stop an original after reading is completed, and then to kick out a next original on the sheet supply stacker by the reverse drive of a drive motor. The drive motor will then switch from the reverse drive to a forward drive when the next original reaches a registration position disposed partway in the feed path for conveying an original from the sheet supply stacker to the platen. This action simultaneously conveys the next original to the platen and conveys the previous original to the discharge stacker.

However, in recent years, demand has increased for an apparatus that can read originals, for high quality images that are free of distortion or image skewing, and that can handle large volumes of originals. Thus, to attain good quality readings of originals, it is preferred to reduce the angle for lifting an original in order to prevent shaking of original images that is caused by the shock of lifting the original from the platen. Conversely, to increase capacity of a discharge stacker, the discharge stacker must be made deeper to hold larger volumes of originals. In order to keep the lifting angle of the original small, and to enable a discharge stacker to hold a large volume of originals, the discharge path from a reading position to the discharge stacker naturally must be longer in comparison to the feed path.

Furthermore, applying the conveyance control method described above to this apparatus would cause an original to be discharged to the discharge stacker while a next original is being read by reading means. This causes the problem of varying the load on the drive by discharging an original, and can degrade the image quality of a read image. Still further, a previous original would thus be discharged to the discharge stacker at the same speed as the reading speed of a next original. If the original is discharged at a high speed, the originals on the discharge stacker would become scattered on the discharge stacker. Conversely, discharging at a slow speed would allow the trailing edge of an original to remain at the discharge roller position, thereby causing a problem of improperly aligned discharged originals.

In order to solve these problems, Japanese laid-open patent publication Heisei 11-222345 discloses controlling a feeder to convey originals at a constant rate, with a minimum gap therebetween using a speed of a predetermined range where the reading speed does not hinder the alignment of discharged originals. If the reading speed is outside a predetermined range, the system is controlled to feed a next original after switching the speed to within a predetermined range that also does not hinder the alignment of discharging the previous originals before feeding a next original.

However, even if the means described above are employed, the alignment of discharged originals is not good because the reading speed is within a predetermined range, but different from the discharging speed. Also, if the reading speed is not within a predetermined range, a previous original will be discharged to the discharge stacker while a next original is being read by the reading means. The foregoing varies the load on the drive by discharging an original which degrades the image quality of a read image. Thus, the aforementioned problems remain unsolved. Furthermore, if the reading speed is outside a predetermined speed, the original is discharged after switching to a discharging speed before starting to convey a next original. This means that original processing time increases, which is not desired.

SUMMARY OF THE INVENTION

In view of the aforementioned problems, an object of the present invention is to provide a document feeder that efficiently supplies originals sequentially to a reading position on a platen, and can obtain stable image readings of an original without discharging a previous original during a reading, and that aligns and stores originals in a discharge stacker.

In order to attain the aforementioned objects of the present invention, the disclosed embodiments provide a document feeder for conveying a sheet to be read by a reading apparatus. The document feeder includes: a reading position for reading images of an original conveyed at a predetermined reading speed; a feeding position of a sheet arranged at an upstream side of the reading position; feeding means for feeding a sheet of the feeding position; a discharge position of a sheet arranged at a downstream position of the reading position; a sheet supply path for guiding a sheet from the feeding position to the reading position; and a discharge path for guiding a sheet from a reading position to a discharge path to a discharge predetermined position. Further included are conveying means arranged in the sheet supply path for conveying a sheet to a reading position; drive means for driving the feeding means and discharge means; discharge means arranged in the discharge path for conveying a sheet; and control means for controlling the drive means to change a conveying speed of a guided original at a predetermined position in the sheet supply path to convey the original to the reading position.

The discharge path is configured so that the length from the reading position to the discharge position is longer than the length from the feeding position of the sheet supply path to the reading position.

A sheet trailing edge detection means for detecting a trailing edge of an original conveyed to the feeding path or the discharge path is included. The control means drives the discharge means while the feeding means are stopped, and when it is judged that the original trailing edge has reached a predetermined position of the discharge path based on a signal from the sheet trailing edge detection means, the system drives both the conveying means and the discharge means simultaneously. In particular, the distance with the discharge position for the predetermined position of the discharge path is set to be shorter than the distance of the feeding position and the predetermined position of the feeding path.

Each of the embodiments of the present invention is proposed herein in order to achieve the respective objectives discussed above, and will he explained below with reference to the drawings.

DETAILED DESCRIPTION OF PREFERRED EMBODIMENTS

Hereunder, preferred embodiments of the document feeder according to the present invention shall be described in detail with reference to the accompanying drawings.

Figure 1:
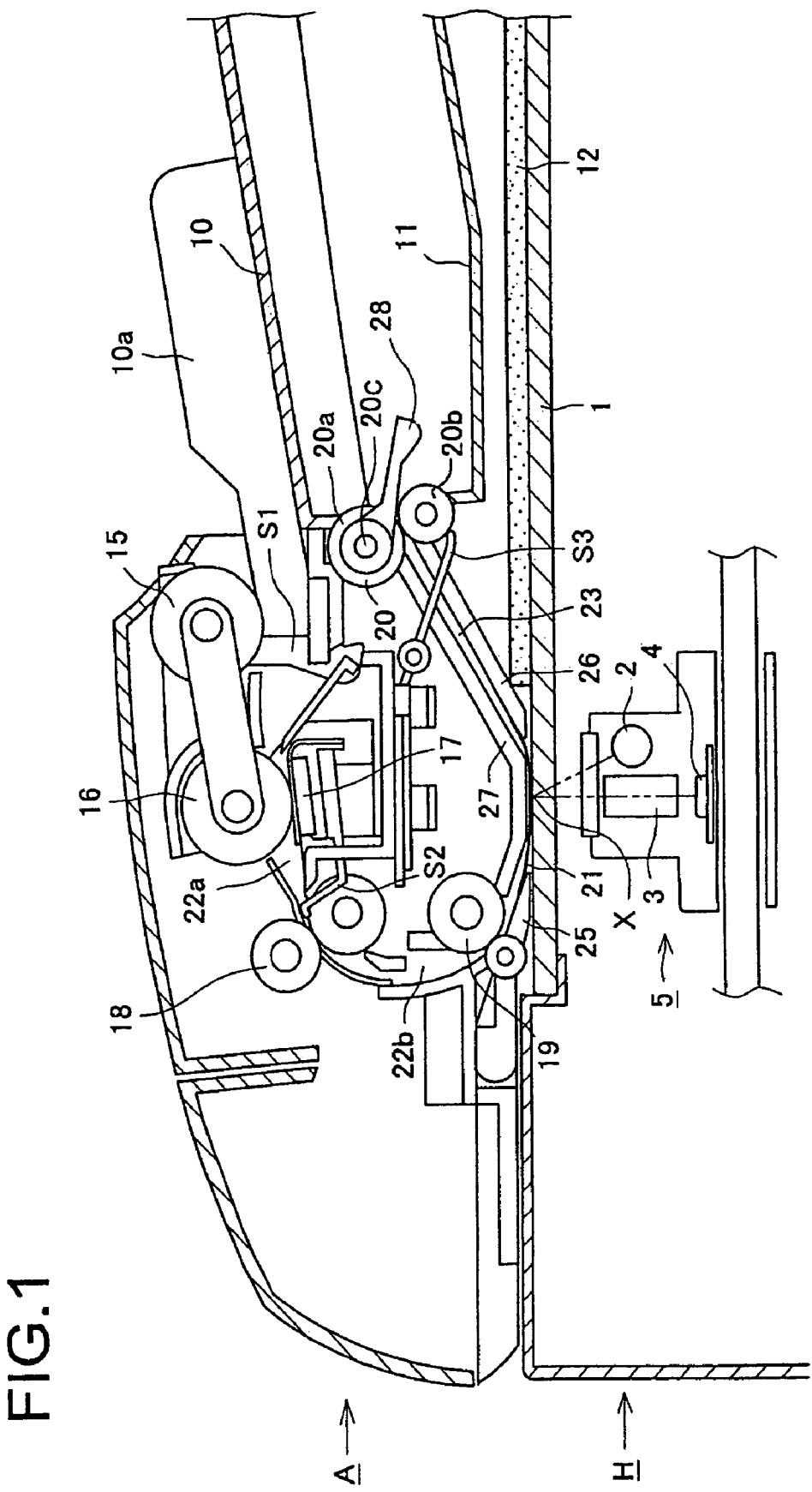
FIG. 1 is a sectional view of the main portion of an original conveyor apparatus employing the present invention and an image reading apparatus mounted with this original conveyor apparatus.

FIG. 1 is a sectional view of the main portion of an original conveyor apparatus (a document feeder) employing the present invention and an image reading apparatus mounted with this original conveyor apparatus.

As shown in FIG. 1, the original conveyor apparatus A is mounted on an original reading apparatus H. The original reading apparatus H reads images on an original fed by the original conveyor apparatus A to a reading position on a platen 1 of the original reading apparatus H. The original data read from the original is sent to an image forming device such as printer or personal computer.

The original reading apparatus H has a reading unit 5 comprising a light source 2, such as an LED; a Selfoc lens 3; and a photo-electrical conversion element 4, such as a CCD. The original reading apparatus H radiates light from the light source 2 through the platen 1 onto the conveyed original. Then, the images pass through the Selfoc lens 3 to be photo-electrically converted by the photo-electrical conversion element 4, such as a CCD, to read the images on the original. The original reading apparatus H has a mode for reading images on a thick original, such as a book, placed stationary on the platen 1 by opening the original conveyor apparatus A. In this mode, the reading unit 5 travels in a sub-scanning direction. The original reading apparatus H also has a mode for reading an original conveyed over the platen by the original conveyor apparatus A. In this mode, the reading unit 5 is set stationary at a predetermined reading position X over which the original is conveyed.

The original conveyor apparatus A has a sheet supply stacker 10 for stacking originals; a discharge tray 11 for storing read originals; and a pressing cover 12 having a porous member such as a sponge and a film member such as a white-colored Mylar sheet for pressing against the platen 1. Also, a side guide 10a is disposed for aligning a width position of originals stacked on the sheet supply stacker 10.

The feed path of the original feeding mechanism comprises a supply path 22a and a supply path 22b for guiding an original on the sheet supply stacker 10 to a reading position X on the platen 1, and a discharge path 23 for guiding an original from the reading position X to the discharge stacker 11.

The original feeding mechanism has a kick roller 15 that rises and lowers to touch the uppermost original stacked on the sheet supply stacker 10 for feeding the original; separating means having a feed roller 16 for feeding the original kicked out by the kick roller 15; a separating member 17 for allowing only the uppermost original to pass and for stopping subsequent originals from being conveyed; and a pair of registration rollers 18 that touch a leading edge of the original separated by the separating means, for aligning the leading edge and for feeding the original to a downstream side. A pair of conveyor rollers 19 is arranged before a reading position X for feeding an original to the reading position X. A pair of discharge rollers 20 is arranged at a downstream side of the reading position X for discharging an original to the discharge stacker 11. A rotatable discharge flapper 28 is disposed on a drive shaft 20c of a drive roller 20a of the pair of discharge rollers 20. The flapper 28 is able to fall under its own weight.

Figure 9A:
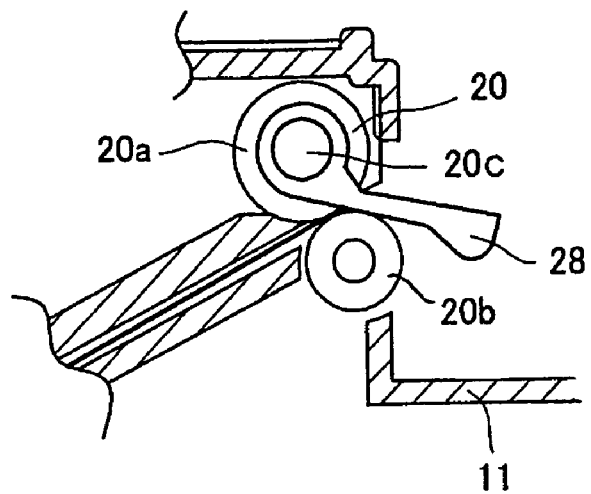
FIG. 9A illustrates the operation of a discharge flapper, specifically showing a leading edge of an original reaching a pair of discharge rollers.
Figure 9B:
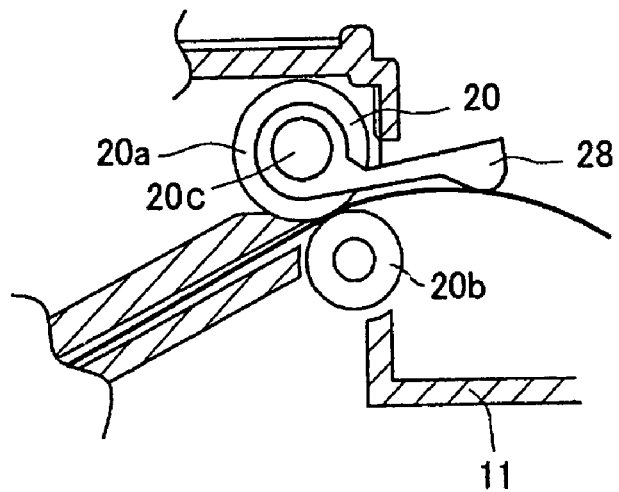
FIG. 9B shows the original being discharged to a discharge stacker.
Figure 9C:
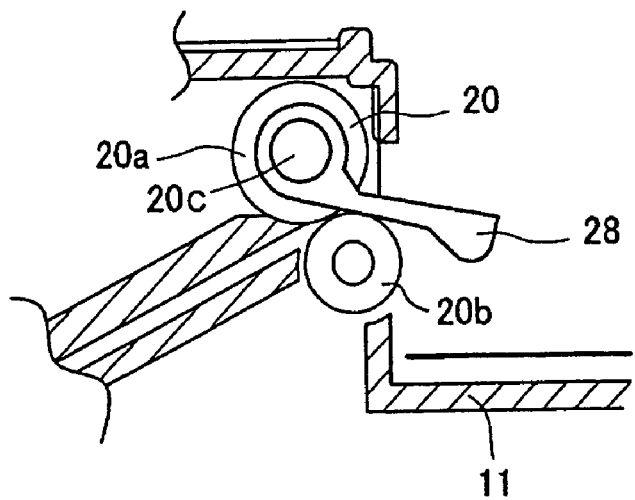
FIG. 9C shows the discharge of the original being completed.

An original sheet is guided along the supply path 22a on the sheet supply stacker 10 by the kick roller 15 and the feed roller 16. The pair of registration rollers 18 and the pair of conveyor rollers 19 convey the original along the supply path 22b to the reading position X. The pair of conveyor rollers 19 and the pair of discharge rollers 20 pass the original over the reading position X. As the original passes over the reading position X, the reading unit 5 positioned in a stationary state under the platen 1 reads the images on the original. The read original continues to travel along the discharge path 23 to be discharged to the discharge stacker 11. At that time, the original discharged by the pair of discharge rollers 20 engages the discharge flapper 28 as shown in FIGS. 9A-9C. (See FIG. 9A.) The force of the original conveyed by the pair of discharge rollers 20 rotates the discharge flapper 28. (See FIG. 9B.) The discharge flapper 28 guides the original being discharged to the top of the discharge stacker 11 downward. (See FIG. 9C.) This action of the discharge flapper 28 prevents an original from flying out with the force of its movement and allows for a good alignment of discharged originals in the discharge stacker 11.

It should be noted that a transparent film member 21 is disposed between the platen 1 and a white backup guide 27. This transparent film member 21 is mounted to bridge between an upstream guide 25 at an upstream side of the reading position X, and a downstream guide 26 at a downstream side of the reading position X. The transparent film member forms a reading path with the white backup guide 27. This structure guides an original conveyed by the pair of conveyor rollers 19 along the transparent film member 21 without hindrance to the downstream guide 26.

According to this embodiment of the present invention, the angle for lifting an original from the platen 1 of the discharge path 23 is small and the length from the reading position X to the discharge stacker 11 is formed to be as long as is possible. This reduces the shock of lifting the original and prevents any shaking of the read image. This also allows the position of the discharge outlet to be higher than the original storage surface of the discharge stacker 11, thereby increasing the capacity of the discharge stacker 11 to hold originals.

Figure 2:
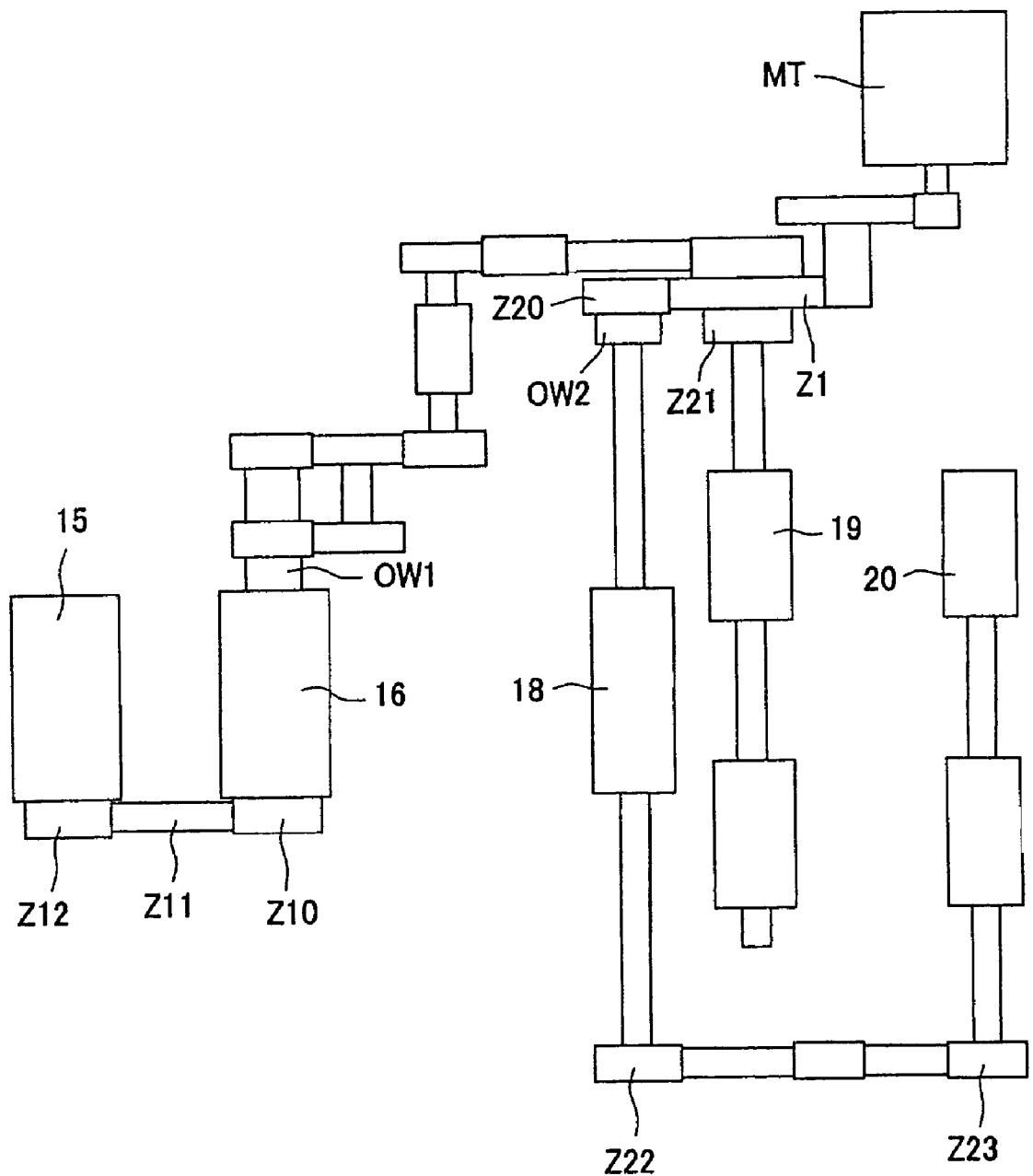
FIG. 2 shows a drive transmission system of the apparatus shown in FIG. 1.

FIG. 2 is a diagram of a drive transmission system showing the drive structure of the original feeding mechanism as a drive means. This structure drives the kick roller 15, the feed roller 16 with a forward drive of a drive motor MT that is capable of both forward and reverse drives. A reverse drive of the drive motor MT drives the pair of registration rollers 18, the pair of conveyor rollers 19 and the pair of discharge rollers 20.

The forward drive of the drive motor MT is transmitted to the main gear Z1 via a plurality of gears. From the main gear Z1, this forward drive is further transmitted to the feed roller 16 via a plurality of gears. This configuration rotates the feed roller 16 in an original conveying direction. A gear Z10 is disposed on a drive shaft of the feed roller 16. Therefore, the drive of the feed roller 16 is also transmitted to the kick roller 15 via a gear Z12 disposed on a shaft of the kick roller and a gear Z11.

A one-way clutch OW1 is disposed on the drive shaft of the feed roller 16. The one-way clutch OW1 is configured to transmit only the forward drive of the drive motor MT to the feed roller 16, and to the kick roller 15, and not to transmit the reverse drive of the motor MT.

The reverse drive of the drive motor MT is transmitted to the main gear Z1 via a plurality of gears. A gear Z20 and a gear Z21 are mounted to each of one side of a drive shaft of the registration roller 18 and a drive shaft of the conveyor rollers 19. The gears Z20 and Z21 mesh with the main gear Z1 to transmit the reverse drive of the drive motor MT to the registration roller 18 and to the conveyor rollers 19. A gear Z22 is mounted to the other side of the drive shaft of the registration roller 18. Thus, the drive of the registration roller 18 is transmitted from the gear Z22 to a gear Z23 mounted on a drive shaft of the discharge roller 20 via a plurality of gears. Through this structure, the drive transmitted from the drive motor MT to the drive shaft of the registration roller 18 is transmitted to the shaft of the discharge roller 20 thereby rotating the discharge roller 20 in an original conveying direction.

A one-way clutch OW2 is disposed on the drive shaft of the registration roller 18. The one-way clutch OW2 is configured to transmit only the reverse drive of the drive motor MT to the registration roller 18, and to the discharge roller 20, and not to transmit the forward drive of the drive motor MT. It should be noted that the conveyor rollers 19 rotate in an original conveying direction with the reverse drive of the drive motor MT and that the conveyor rollers 19 are configured to rotate in a direction reverse to the original conveying direction with the forward drive of the drive motor MT. However, as described in further detail below, an original is not present at the conveyor rollers 19 position when the conveyor rollers 19 are rotating in the reverse direction, so the original is not hindered.

Also, one end of a rocking arm, that is not shown, that supports the kick roller 15 is mounted to the drive shaft of the feed roller 16. The rotation of the drive shaft in the original conveying direction (with the forward drive of the drive motor MT) rotates the rocking arm, thereby lowering the kick roller 15. When the kick roller 15 touches the original the actions of spring clutches CL1 and CL2, both not shown, cause the drive shaft of the feed roller 16 to idle with regard to the rocking arm. The reverse drive of the drive motor MT is also transmitted to the drive shaft of the feed roller 16. This rotates the rocking arm in the counterclockwise direction, thereby raising the kick roller 15. At this time, the feed roller 16 does not rotate because of the affect of the one-way clutch OW1. The raised rocking arm touches a regulating member, which is not shown. The action provided by a spring clutch CL3, that is also not shown, causes the rocking arm and the drive shaft of the feed roller 16 to idle.

It should be noted that according to this embodiment of the present invention, a single drive motor MT configures drive means to drive each roller, in order to simplify the structure by reducing the number of composing parts which in turn reduces the number of hours and costs associated with assembly.

However, it is perfectly acceptable to employ separate motors. In other words, it is acceptable to have a drive motor for driving the kick roller, the feed roller and the registration roller, and a drive motor for driving the conveyor rollers and the discharge rollers.

Figure 3:
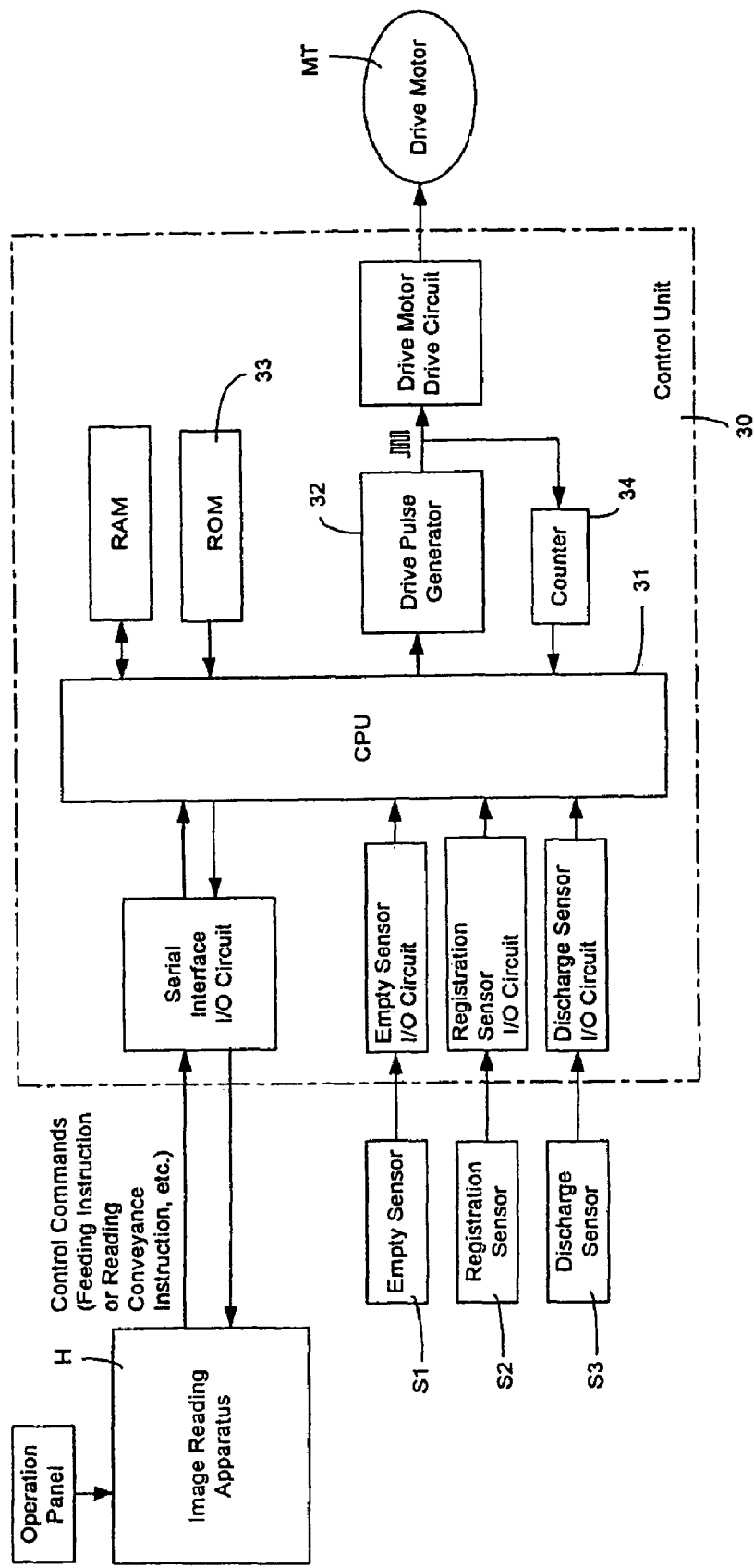
FIG. 3 shows a block diagram of the control system of the apparatus shown in FIG. 1.
Figure 4A:
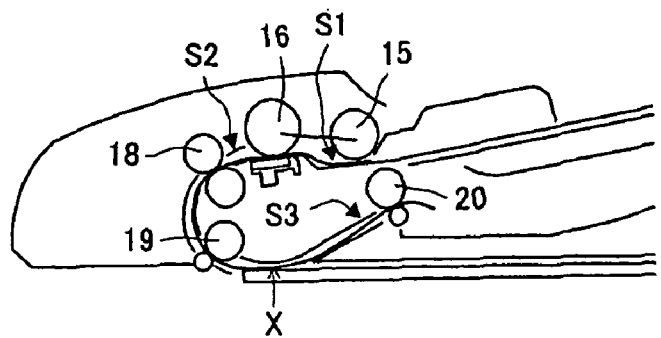
FIG. 4A shows a previous original conveyed through the apparatus shown in FIG. 1 that is being read.
Figure 4B:
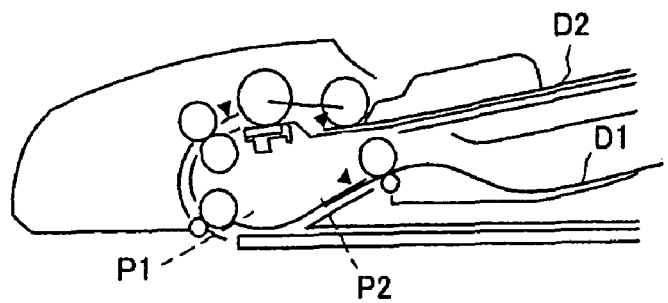
FIG. 4B shows a previous original conveyed through the apparatus shown in FIG. 1 that is idling in a discharge path.
Figure 4C:
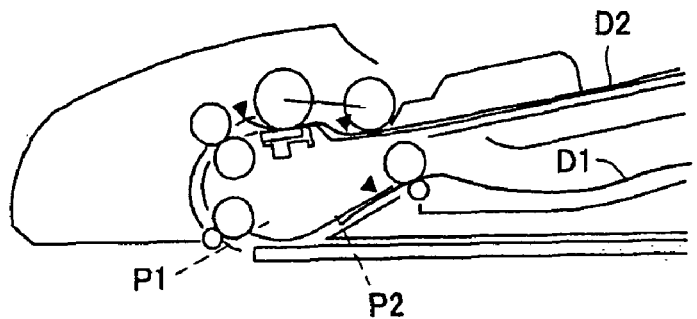
FIG. 4C shows a next original conveyed through the apparatus shown in FIG. 1 that is being separated and kicked from a stacker.
Figure 4D:
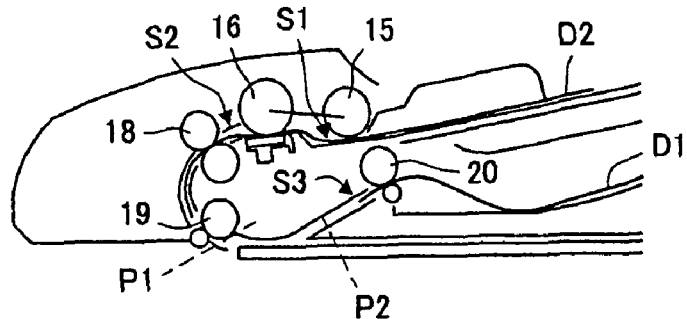
FIG. 4D shows the previous original conveyed through the apparatus shown in FIG. 1 that is being discharged, with the next originals being kicked from a pair of registration rollers.
Figure 4E:
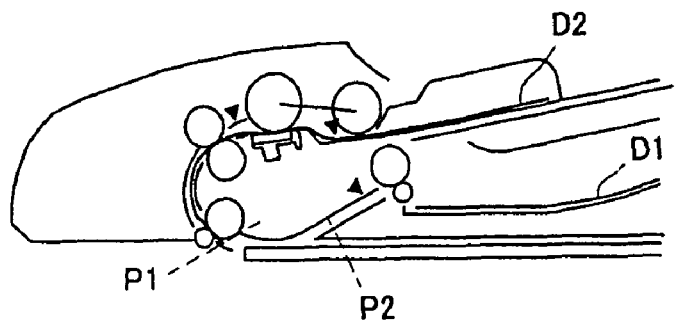
FIG. 4E shows a previous original conveyed through the apparatus shown in FIG. 1 that is completing the discharge process, with the next original reaching a position where a speed is switched.

The following will describe detection sensors and a control system of the original conveyor apparatus A with reference to FIG. 1 and the control block diagram of FIG. 3. As shown in FIG. 1, an empty sensor S1 is disposed at the downstream side of the sheet supply stacker 10 in an original conveying direction, for detecting an original stacked on the sheet supply stacker 10. A registration sensor S2 is disposed in the supply path 22a for detecting an end of the original. A discharge sensor S3 is disposed in front of the pair of discharge rollers 20 of the discharge path 23. Detection of a trailing edge of an original by the discharge sensor S3 is used to judge whether the original has been discharged.

Each of the sensors S1 to S3 arranged in the path is connected to a control unit 30 used as a control means for controlling the drive of the entire apparatus, as shown in FIG. 3. The control unit 30 is connected by a communication cable to a control unit of the original reading apparatus H. The control unit 30 receives various commands from the original reading apparatus H, including a paper feed instruction and a reading conveyance instruction. The drive motor MT drive is controlled according to the detection signals from each of the sensors and commands and information received from the original reading apparatus H.

The control unit 30 as control means sends various commands to the original reading apparatus H, including original conveyance information and a read command for the reading unit 5 to start reading an original.

It should be noted that the drive motor MT is a pulse motor. A plurality of speed data for the drive motor MT is recorded on a ROM 33. The CPU 31 selects one of the speed data and outputs a drive pulse signal from a drive pulse generator 32 according to the selected speed data. The drive motor MT is configured to drive according to the drive pulse signal output from the drive pulse signal generator 32 in this way, the system controls the conveying speed of the supplied and conveyed originals, and conveys an original at a reading speed set for whether the original is in color or black and white, and for the reading resolution of the reading unit 5, at the reading position X.

Note that drive pulse signals output from the drive pulse generator 32 are fed back to the CPU 31 which counts the number of those pulses. The system uses the counted number of pulses to measure the amount of the drive motor MT drive to detect the position of the original being conveyed.

This embodiment of the present invention conveys a previously fed original and a next original with the following conveying method to improve conveying efficiency of the original and to avoid a problem in alignment in discharging the originals. FIG. 8A through 8D are views of the conveying method. The following will describe an original conveying method for a previously fed original and a next original, based on the FIG. 8A to 8D. It should be noted that the description uses the same numbers as those used in the embodiment just described.

Figure 8A:
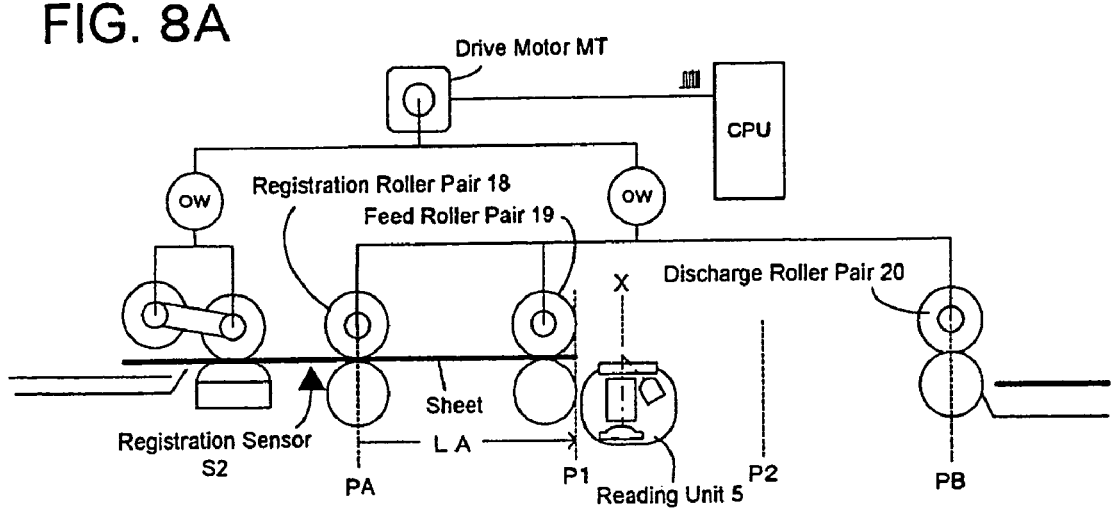
FIG. 8A shows a state where a leading edge of an original reaches a position where a speed is changed.

As shown in FIG. 8A, after a leading edge of a previous original is aligned by the pair of registration rollers 18, the system measures the original conveyed a distance LA from a nipping position (feeding position PA) of the registration roller 18 to a reading speed switching position P1, and switches from a "high speed" to a "reading speed." In one embodiment, it is acceptable for the measurement of the distance LA to be done by counting the number of pulses output by the drive motor MT that is equivalent to the distance LA from the start of the reverse drive of the drive motor MT.

Figure 8B:
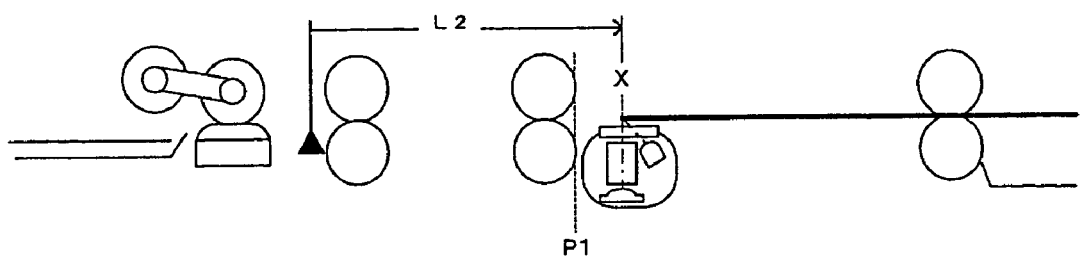
FIG. 8B shows a state where a trailing edge of an original passes a reading position.

As shown in FIG. 8B, after the registration sensor S2 detects the trailing edge of the original being read, and the system measures that the previous original has been conveyed a distance of L2, at that point, the system judges that the trailing edge of the previous original has passed the reading position X and that the reading operation is completed. The system then switches the conveying speed of the original from a "reading speed" to a "high speed" to convey the original. In one embodiment, the measurement of the distance L2 is accomplished by counting the number of pulses output by the drive motor MT that is equivalent to the distance L2 after the registration sensor S2 detects a trailing edge of the original. When the reading unit 5 detects a trailing edge of the original, the system can count the number of pulses output by the drive motor MT that is equivalent to the distance L3.

Figure 8C:
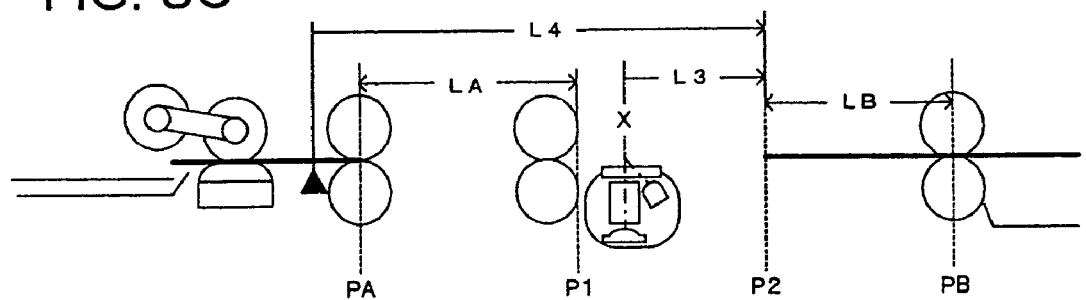
FIG. 8C shows a state where the leading edge of the original is at a discharge idling position and a next original is kicked by a pair of registration rollers.

Then, as shown in FIG. 8C, when the system has calculated that the trailing edge of the original has passed the reading position X, and that the trailing edge of the previous original conveyed at a high speed has reached a discharge idling position P2, the system temporarily stops the drive motor MT, and then drives it in the forward direction. This forward drive starts the feeding of the next original while the trailing edge of the previous original is stopped at the discharge idling position P2. The discharge idling position P2 is set to have the following relationship. (Distance LA from feeding position PA to the reading speed switching position P1)>(Distance LB from the discharge idling position P2 to a discharge position PB). The arrival of the original at the discharge idling position P2 can be determined by counting the number of pulses output by the drive motor MT that is equivalent to the distance L4 after the registration sensor S2 detects a trailing edge of the original.

Figure 8D:
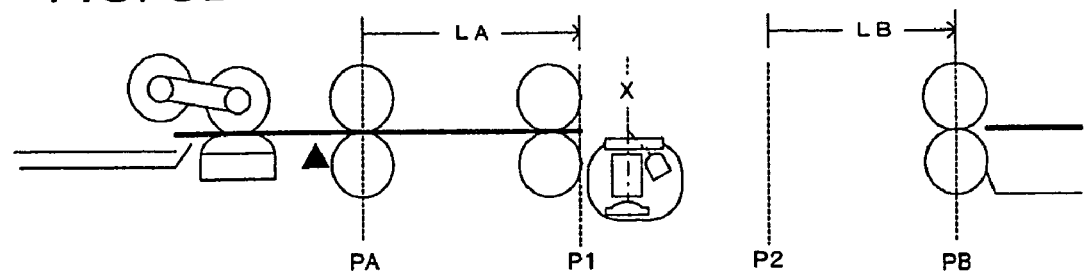
FIG. 8D shows the positional relationship of the leading edge of an original completing a discharge and the next original reaching the position where the speed is switched.

Then, the drive motor MT drives in the reverse direction as shown in FIG. 8D. This conveys the previous, idling original toward the discharge stacker 11. At the same time, the next original nipped at a nipping position of the pair of registration rollers 18 is conveyed toward the reading speed switching position P1. Again, the drive motor switches from a "high speed" to a "reading speed," when the next original reaches the reading speed switching position P1. Therefore, because of the positional relationship of LA>LB, the previous original has passed the discharge position PB and is completely discharged to the discharge stacker 11 prior to the next original reaching the reading speed switching position P1 (prior to the switching to a reading speed).

In other words, with this conveying method, the feeding of a previous original and the discharge of a next original are performed simultaneously which improves conveying efficiency of the original. Furthermore, because the previous original is discharged to the discharge stacker 11 at the point that a reading speed for the next original is switched, originals are always discharged at a constant speed and a problem of original discharge alignment is avoided.

Figure 5:
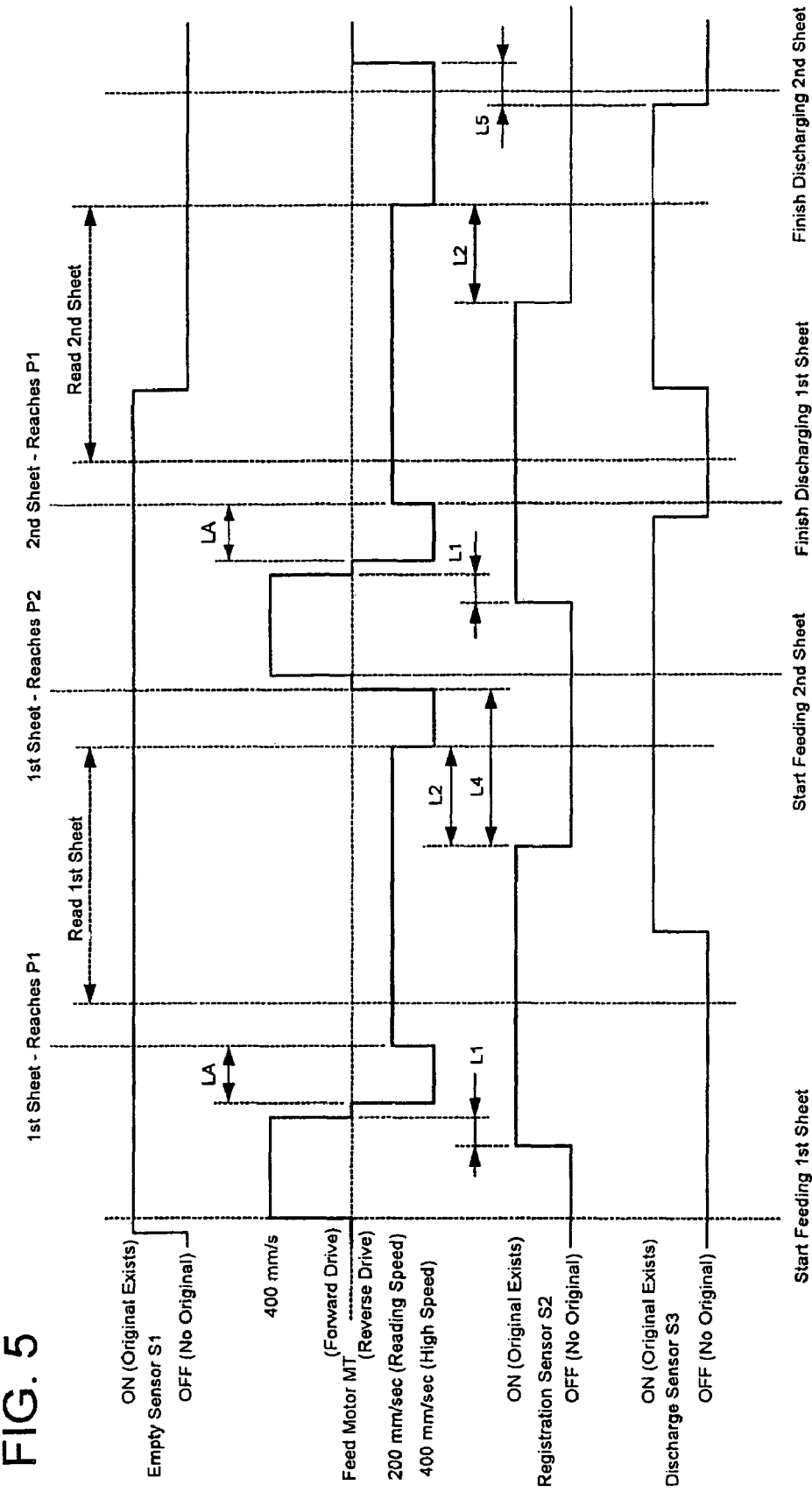
FIG. 5 illustrates a timing chart for the operation of the original conveyor apparatus according to the present invention.
Figure 6A:
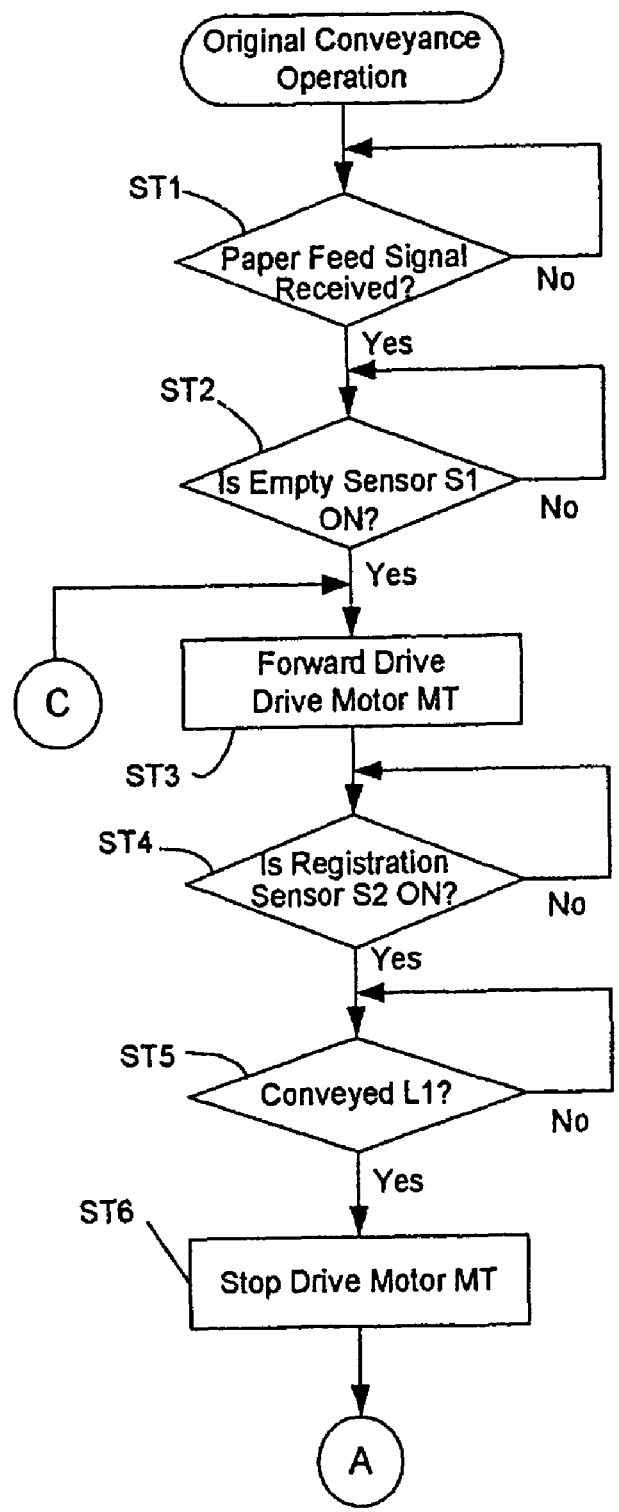
FIGS. 6A-6C illustrate an operational flowchart for the conveyance operation of an original conveyor apparatus according to the present invention.
Figure 6B:
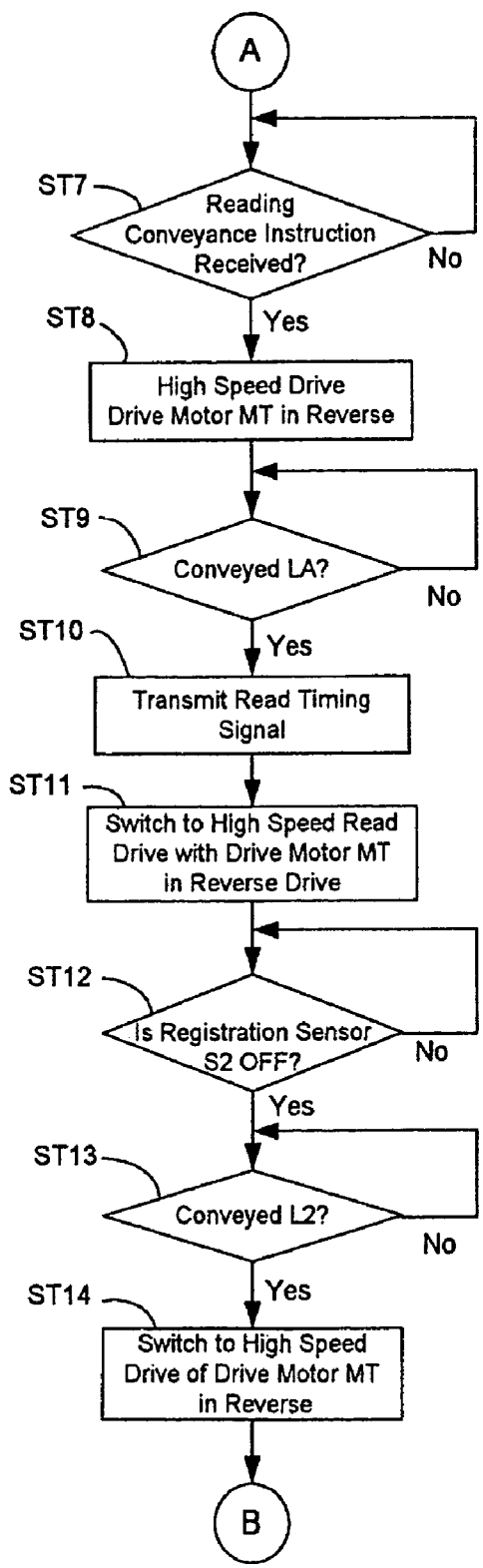
Figure 6C:
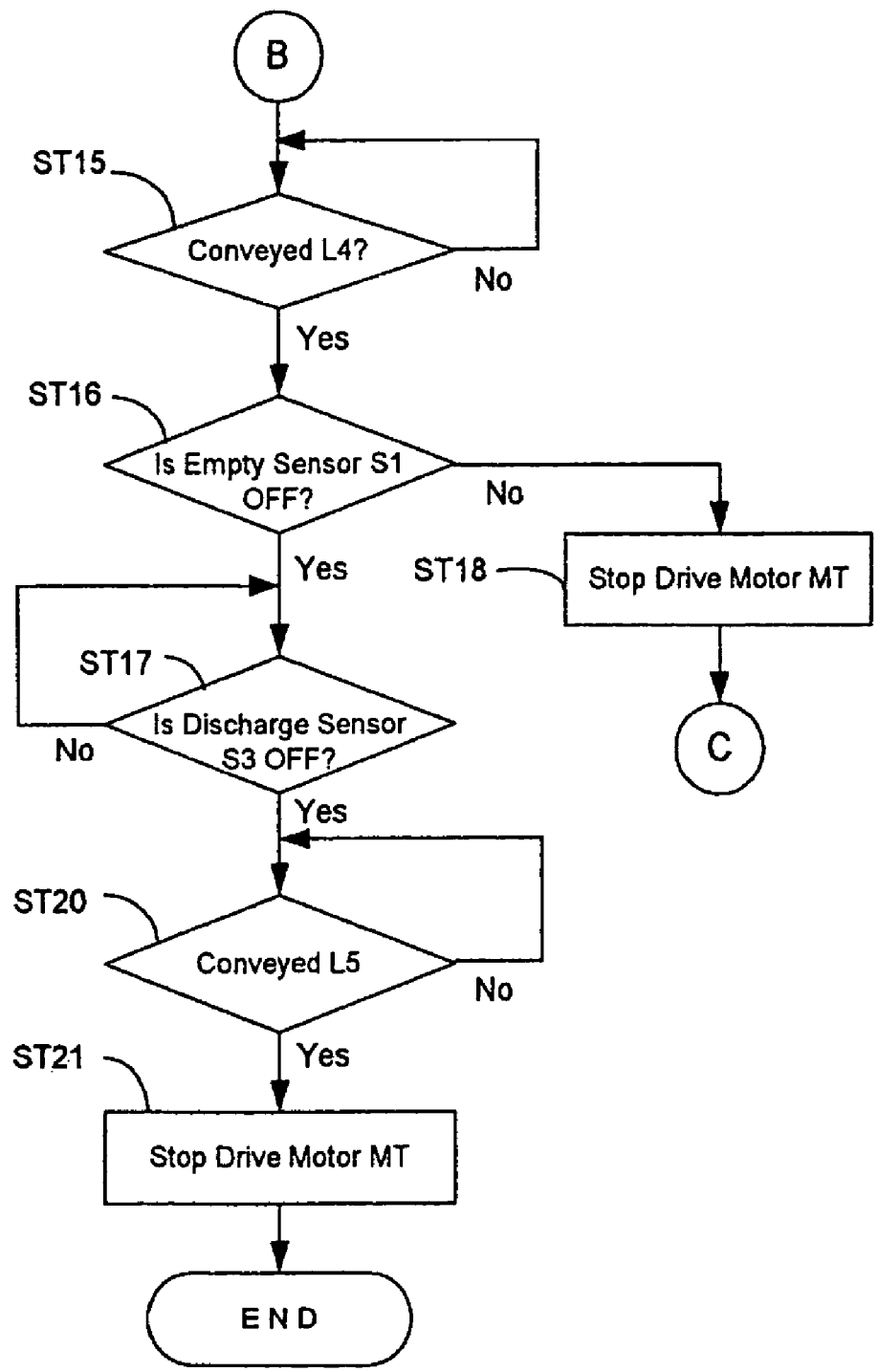

The following will describe the original conveying operation of the original conveyor apparatus A in the embodiment as controlled according to the aforementioned conveying method, with reference to the scheme showing the status of original conveyance of FIG. 4A through 4E. The description will also refer to the timing chart of FIG. 5 and the operation flowchart of FIGS. 6A-6C.

A paper feed signal is received from an operation panel or an external device, which is not shown. When the empty sensor S1 detects an original on the sheet supply stacker 10, the drive motor MT drives in the forward direction causing the kick roller 15 to kick out an original. (ST1 to ST3) Kicked out originals are separated into a single sheet by separating means composed of the feed roller 16 and the separating member 17. A single original is then conveyed downstream. When the registration sensor S2 detects the leading edge of the original, the drive motor MT temporarily stops after conveying the original a predetermined distance (L1) after that detection. (ST3 to ST6) When the leading edge of the original has engaged a nipping point on the pair of registration rollers 18 to form a curl in the original, the drive motor MT stops. This aligns the leading edge of the original and removes any skew in the original. After this temporary stop of the drive motor MT, the system judges whether the original reading apparatus H is in a state ready to read the original by receiving a reading conveyance instruction signal. If the original reading apparatus H is ready to read the original, the drive motor MT drives at a high speed with a reverse drive. (ST7 to ST8) This rotates the pair of registration rollers 18, the pair of conveyor rollers 19, and the discharge rollers 20 to convey the original toward the reading position X at high speed.

As the leading edge of the original reaches a predetermined reading speed switching position P1 in front of the reading position X, the system sends a reading timing signal to the original reading apparatus H and switches the drive motor MT from a high speed drive to a reading speed (ST9 to ST11) This conveys the original at a reading speed over the reading position X while the reading unit 5 reads the images on the original. Note that the system counts drive pulse signals from the point where the drive motor MT starts driving in the reverse direction to judge whether the original has reached the reading speed switching position P1. This is recognized by counting the number of drive pulses that is equivalent to the distance LA from the nipping position of the pair of registration rollers 18 to a predetermined reading speed switching position P1.

Then, the drive motor MT switches to a high speed based on the original being conveyed a predetermined distance (L2) after the registration sensor S2 has detected the trailing edge of the original being read. (ST12 to ST14) At this time, the trailing edge of the original has passed the reading position X and the reading of the original images is completed. In other words, the predetermined distance of L2 described above is a distance for the trailing edge of the original to reach the reading position X from the registration sensor S2 position.

The read original is thus conveyed by the pair of discharge rollers 20 at a high speed by the drive motor MT switching to high speed. When the trailing edge of the sheet reaches a predetermined discharge idling position P2, the empty sensor S1 detects whether there is a next original D2 on the sheet supply stacker 10. (ST15 to ST16) If the empty sensor S1 judges that there is not a next original D2, the drive motor MT continues rotating with a reverse drive. This drive continues for a distance after the discharge sensor S3 has detected the trailing edge of the original for the trailing edge of the original to completely reach the discharge stacker 11. Then, the drive motor MT stops. (ST17 to ST21) Conversely, if the empty sensor S1 detects a next original D2, the next original D2 feeding operation starts after drive motor MT temporarily stops. (ST18) At this time, the previous original D1 is idling at the discharge idling position P2.

The position of the discharge idling position P2 is set so that the distance from the nipping position of the pair of discharge rollers 20 to the discharge idling position P2 (distance LB) is shorter than the distance from the nipping position of the pair of registration rollers 18 to the reading speed switching position P1 (distance LA). The system counts the number of drive pulses of the drive motor MT after the registration sensor S2 detects the trailing edge of the original. When the count value reaches a value equivalent to the distance (L4) from the registration sensor S2 position to the discharge idling position P2, the system recognizes that the trailing edge of the original has reached the discharge idling position P2.

In the feeding operation of the next original D2, the drive motor MT drives in the forward direction, in the same way as for the previous sheet (the previous original D1) thereby causing the kick roller 15 to kick out the next originals D2. The feed roller 16 and the separating member 17 separate the next originals D2 into a single original. Then, the leading edge of the next original D2 engages a nipping portion of the pair of registration rollers 18 and is thus aligned. (ST3 to ST6)

Next, if the original reading apparatus H is ready to read the next original D2, the drive motor MT drives in the reverse direction at a high speed. This rotates the pair of registration rollers 18 and the pair of conveyor rollers 19 to convey the next original D2 at a high speed toward a reading speed switching position (P1) and rotates the pair of discharge rollers 20 that convey the previous original D1 idling at the discharge idling position (P2) toward the discharge stacker 11.

Then, when the leading edge of the next original D2 reaches the reading speed switching position P1, the drive motor MT switches from a high speed to a reading speed. Because the distance (LB) from the nipping position of the pair of discharge rollers 20 to the discharge idling position P2 is shorter than the distance (LA) from the nipping position of the pair of registration rollers 18 to the reading speed switching position P1, the previous original D1 has already passed the nipping position of the pair of discharge rollers and has been discharged into the discharge stacker 11 by the time the leading edge of the next original D2 has reached the reading speed switching position P1.

The previous original D1 is discharged to the discharge stacker 11 at a high speed, but because the discharge flapper 28 guides the original downward, the original is prevented from flying outward with the force of its speed and is neatly stacked in the discharge stacker 11. Furthermore, because the original is discharged as though being coiled around a follower roller 20b of the pair of discharge rollers 20, the original is prevented from remaining in the path stuck on the follower roller 20b of the pair of discharge rollers 20.

When the trailing edge of the next original D2 passes the reading position X traveling at a reading speed, the conveying speed switches to a high speed, in the same way as with the previous original D1. Then, when the trailing edge of the next original D2 reaches the discharge idling position P2, the empty sensor S1 detects the presence of an original on the sheet supply stacker 10. If there are no more originals on the sheet supply stacker 10, the conveyance operation is continued. If there is an original on the sheet supply stacker 10, the system stops the next original D2 at the discharge idling position P2 and starts feeding a subsequent original on the sheet supply stacker 10.

Then, the feeding and conveying operations described above are repeated until the last original on the sheet supply stacker 10 has been fed and conveyed.

According to this embodiment of the present invention, the discharge idling position P2 is set so that the distance (LB) from the nipping position of the pair of discharge rollers 20 to the discharge idling position P2 is shorter than the distance (LA) from the nipping position of the pair of registration rollers 18 to the reading speed switching position P1 so the discharging speed of an original is not varied according to the reading conditions, such as the magnification of the reading. Originals can always be discharged at a constant speed. This makes it possible to attain a good alignment of discharged originals.

Furthermore, the system controls a previous original so that it stops temporarily at the discharge idling position P2, and feeds a next original from a nipping point after it is fed to the pair of registration rollers 18, and discharges the previous original from the discharge idling position P2 simultaneously, so original processing time is shortened.

As described in relation to the embodiment of the present invention, the drive motor MT drives at a high speed until the leading edge of the next original D2 reaches the reading speed switching position P1, and the discharging of the previous original D1 and the conveying of the next original D2 are performed at a high speed. However, it is also acceptable to control this so that in the process of the next original D2 to reach the reading speed switching position P1, the drive, speed of the drive motor MT switches from a high speed to a speed that is appropriate for aligning discharging originals, to discharge the previous original D1 at a speed appropriate for the discharge.

Figure 7A:
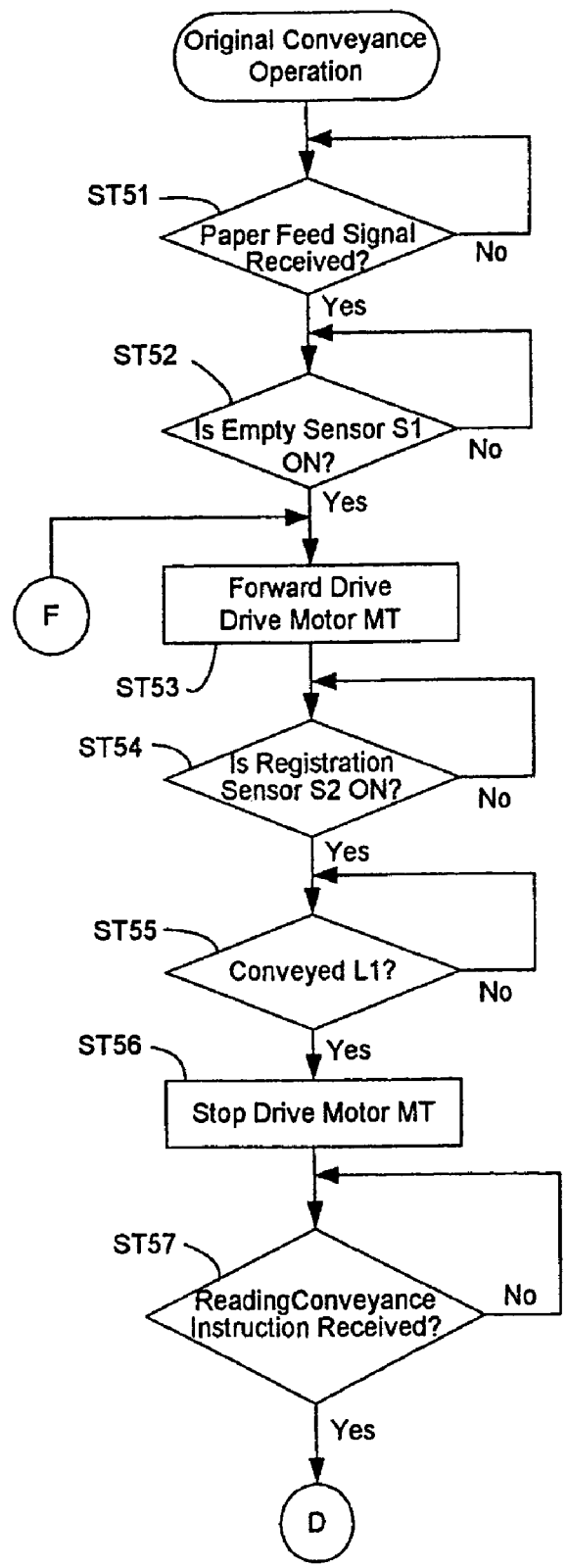
FIGS. 7A-7C illustrate an operational flowchart for another embodiment of the conveyance operation of the original conveyor apparatus according to the present invention.
Figure 7B:
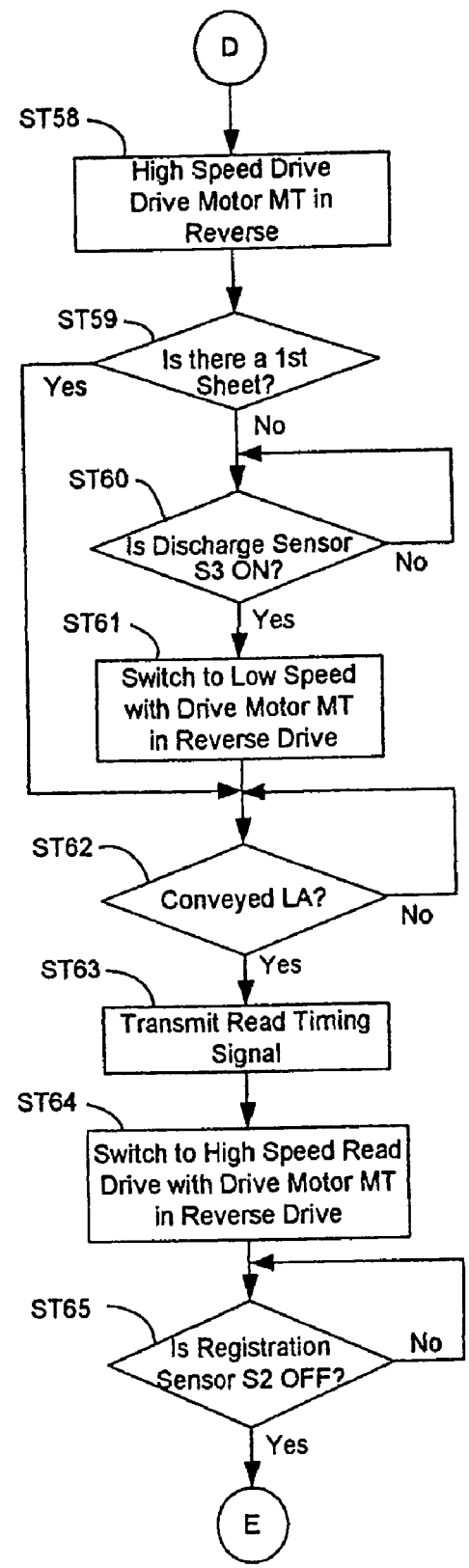
Figure 7C:
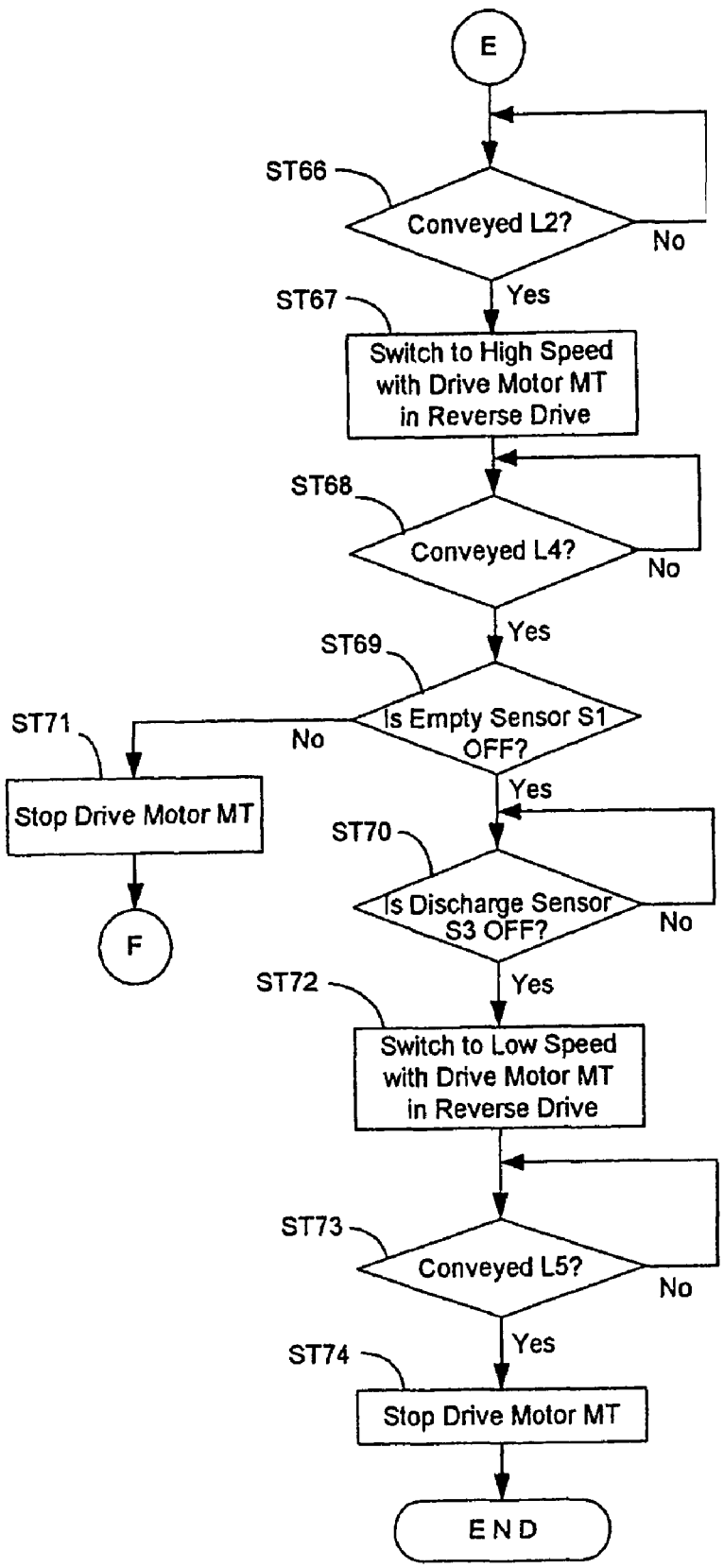

A detailed embodiment of this case will be described below with reference to the operational flowchart of FIG. 7A-7C. The system judges whether an original is a first original when the original is conveyed to the pair of registration rollers 18 by the reverse drive of the drive motor MT. (ST58 to ST59). If the original is a first one, the drive motor MT drives at a high speed to convey the original until the leading edge of the originals reaches the reading speed switching position P1. At that point the drive motor MT switches to a reading speed. This switches the conveyance speed of the original from a high speed to a reading speed to convey the original to the reading position X at that speed. On the other hand, if the original is a second original, the drive motor drives in the reverse direction to rotate the pair of discharge rollers 20 because a previous original is idling at the discharge idling position P2. This drive conveys the original that is at the nipping position of the pair of registration rollers 18 and previous original simultaneously. The drive motor MT switches from a high speed drive to a low speed drive (ST60 to ST61) when the discharge sensor S3 detects a trailing edge of the original. This discharges the previous original to the discharge stacker 11 at a low speed. Then, when the leading edge of the original reaches the reading speed switching position P1 after the previous original is discharged, the drive motor MT drive speed switches to a reading speed.

Subsequent operations (ST62 to ST74) are performed in the same way as described for the embodiment above (ST9 to ST21) and so any further description will be omitted.

This makes it possible to discharge originals to the discharge stacker 11 at a constant speed. Furthermore, in order for good discharge alignment of stacked originals in the discharge stacker 11, this embodiment requires a special member, such as a discharge flapper 28, to be disposed.

In the embodiment described above, a one-way clutch is employed to drive the kick-roller 15 and the feed roller 16 with a forward drive of the drive motor MT, and to drive the pair of registration rollers 18 and the discharge roller 20 with a reverse drive of the drive motor MT. However, it is also perfectly acceptable to employ a solenoid clutch between the drive motor MT, the kick roller 15, and the feed roller 16 to transmit and cut-off the drive of the drive motor MT at an appropriate timing to drive the kick roller 15 and feed roller 16.

According to this embodiment of the present invention, the discharge path is comparatively longer than the feed path. Therefore, even if the storage capacity for originals of the discharge stacker is increased, the angle for lifting an original from the platen 1 of the discharge path can be small thereby preventing shaking when reading an image.

The configuration calls for a single motor to drive a plurality of feed rollers, so there are fewer composing parts. This simplifies the structure and control, and reduces working hours and costs associated with assembly.

Still further, in the apparatus wherein the discharge path is comparatively longer than the feed path, the distance from a stopping position of an original after reading to a nipping point at the discharge rollers 20 (at the discharge outlet) is shorter than the distance from the pair of registration rollers to the reading speed switching position so even if the reading speed varies according to the reading magnification or reading resolution, the alignment of the discharged originals is not disrupted, and original exchanging time can be shortened while obtaining good quality images.

As discussed above, the present invention shortens original processing time because when a sheet trailing edge sensor detects that a trailing edge of an original has reached a predetermined position of a discharge path, the system is controlled to the drive feeding means and discharge means simultaneously. This makes it possible to simultaneously execute a conveying operation for an original at a predetermined position in the supply path, and a discharge operation of an original in the discharge path.

It should also be noted that because the distance between a predetermined position of the discharge path and the discharge position is shorter than the distance between the feeding position and the predetermined position of the feed path where the speed of the conveyed original is changed to a reading speed, previous originals are always discharged at a constant, predetermined speed to the discharge stacker. This allows originals to be discharged to the discharge stacker in an orderly manner, and enables the system to obtain good quality readings of images on the originals without discharging a previous original while another original is being read.

The disclosure of Japanese Patent Application No. 2004-221503, filed on Jul. 29, 2004, is incorporated in the application.

While the invention has been explained with reference to the specific embodiments, the explanation is illustrative and the invention is limited only by the appended claims.

What is claimed is:

1. A document feeder for conveying sheet originals, comprising:
   a reading device provided at a reading position for reading an image on the original conveyed at a constant reading speed;
   a registration roller arranged at an original feeding position set at an upstream side of the reading position;
   a discharge roller arranged at an original discharge position set at a downstream side of the reading position;
   a feeding path for guiding the original from the feeding position to the reading position;
   a discharge path for guiding the original from the reading position to the discharge roller, wherein a length of the discharge path from the reading position to the discharge roller is longer than a length of the feeding path from the registration roller to the reading position;
   a stacker for stacking a plurality of originals;
   a separating roller for separating the plurality of originals stacked in the stacker and feeding the originals therefrom one at a time to the registration roller;
   a single drive motor having both a forward drive and a reverse drive with the constant reading speed and an increased speed higher than the constant reading speed, wherein the drive motor actuates the separating roller with the forward drive, and drives the registration roller and the discharge roller with the reverse drive;
   a feed roller arranged between the registration roller and the reading position for feeding the original to the reading position;
   a first position set between the feed roller and the reading position, wherein at the first position, an original conveyance speed changes to the reading speed to convey the original to the reading device at the reading speed;
   a second position set between the reading position and the discharge roller, said second position being set such that a distance from the second position to the discharge roller is shorter than a distance between the registration roller and the first position so that when preceding and succeeding originals are transferred successively, a trailing edge of the preceding original passes through the discharge roller before a leading edge of the succeeding original reaches the first position; and control means for controlling the drive motor, said control means:

temporarily stopping and switching the drive motor from the reverse drive to the forward drive at a point wherein the trailing edge of the preceding original reaches the second position to thereby feed the succeeding original from the stacker to the registration roller, temporarily stopping and switching the drive motor from the forward drive to the reverse drive with the increased speed at a point wherein the leading edge of the succeeding original reaches the registration roller to thereby eject the preceding original and simultaneously transfer the succeeding original to the first position, and switching the drive motor from the reverse drive with the increased speed to the reverse drive with the reading speed at a point wherein the leading edge of the succeeding original reaches the first position to thereby pass the succeeding original over the reading position for reading the succeeding original.

2. A document feeder as claimed in claim 1, further comprising a sheet detection sensor arranged in a path between the registration roller and the separating roller, a leading edge of the original being detected to have reached the first position based on a signal from the sheet detection sensor, and the trailing edge of the original is detected to have reached the second position based on the signal from the sheet detection sensor.

3. A document feeder as claimed in claim 2, further comprising another sheet detection sensor arranged in a path of an upstream side of the separating roller, the succeeding original being detected to be stacked in the stacker based on a signal from the another sheet detection sensor.

4. A document feeder as claimed in claim 1, wherein the control means aligns the original conveyed by the separating roller by the forward drive of the drive means by engaging a nipping position of the pair of registration rollers to thereby simultaneously position the leading edge of the original at the feeding position.

5. A document feeder as claimed in claim 1, wherein the reading device is arranged so that the preceding original is completely discharged from the discharge roller when the succeeding original is at the reading position.

6. A document feeder as claimed in claim 1, wherein the control means controls the drive means to decelerate an original discharging speed prior to a position where the trailing edge of the original reaches the discharging roller for discharging of the original.

7. A document feeder as claimed in claim 1, further comprising a discharge stacker situated outside the discharge roller and located under the stacker.

8. A document feeder as claimed in claim 1, further comprising a sheet detection sensor for detecting that the trailing edge of the preceding original passes the reading position, and an empty sensor for detecting a sheet on the stacker, wherein in case the empty sensor detects the sheet on the stacker, said control means switches the drive motor from the reverse drive with the reading speed to the reverse drive with the increased speed and temporarily stops the preceding original at the point wherein the trailing edge of the preceding original reaches the second position.

9. A document feeder as claimed in claim 8, wherein in case the empty sensor detects no sheet on the stacker, said control means continuously drives the drive motor with the reverse drive with the increased speed for the succeeding original with the increased speed wherein the trailing edge of the succeeding original passes the reading position so that the succeeding original is ejected through the discharge roller with the increased speed.

10. A document feeder as claimed in claim 9, wherein the sheet detection sensor is a register sensor arranged between the registration roller and the separating roller.

11. A document feeder for conveying sheet originals, comprising:

a reading device provided at a reading position for reading an image on the original being conveyed at a constant reading speed;

a registration roller arranged at an original feeding position set at an upstream side of the reading position;

a discharge roller arranged at an original discharge position set at a downstream side of the reading position;

a feeding path for guiding the original from the feeding position to the reading position;

a discharge path for guiding the original from the reading position to the discharge roller, wherein a length of the discharge path from the reading position to the discharge roller is longer than a length of the feeding path from the registration roller to the reading position;

a stacker for stacking a plurality of originals;

a separating roller for separating the plurality of originals stacked in the stacker and feeding the originals therefrom one at a time to the registration roller;

a single drive motor having both a forward drive and a reverse drive with the constant reading speed and an increased speed higher than the constant reading speed, wherein the drive motor actuates the separating roller with the forward drive, and drives the registration roller and the discharge roller with the reverse drive;

a feed roller arranged between the registration roller and the reading position for feeding the original to the reading position;

a first position set between the feed roller and the reading position, wherein at the first position, an original conveyance speed changes to the reading speed to convey the original to the reading device at the reading speed;

a second position set between the reading position and the discharge roller, said second position being set such that a distance from the second position to the discharge roller is shorter than a distance between the registration roller and the first position so that when preceding and succeeding originals are transferred successively, a trailing edge of the preceding original passes through the discharge roller before a leading edge of the succeeding original reaches the first position;

a sheet detection sensor arranged between the registration roller and the separating roller; and control means for controlling the drive motor, said control means temporarily stopping and switching the drive motor from the reverse drive to the forward drive at a point wherein the trailing edge of the preceding original reaches the second position to thereby feed the succeeding original from the stacker to the registration roller, temporarily stopping and switching the drive motor from the forward drive to the reverse drive with the increased speed at a point wherein the leading edge of the succeeding original reaches the registration roller to thereby feed the preceding original and the succeeding original to a downstream side, switching the drive motor from the reverse drive with the increased speed to a speed lower than the increased speed at a point wherein the sheet detection sensor detects the trailing edge of the preceding original to thereby eject the preceding original and simultaneously feed the succeeding original to the first position, and switching the drive motor to the reverse drive with the reading speed at a point wherein the leading edge of the succeeding original reaches the first position to thereby pass the succeeding original over the reading position.

* * * * *